UNITED STATES PATENT OFFICE.

EDWIN ROAT, OF BUFFALO, NEW YORK.

IMPROVEMENT IN LUBRICATING COMPOUNDS.

Specification forming part of Letters Patent No. 136,868, dated March 18, 1873.

*To all whom it may concern:*

Be it known that I, EDWIN ROAT, of the city of Buffalo, county of Erie, and State of New York, have invented a compound called Lubricating-Oil, to be used in lubricating or oiling all kinds of machinery, of which the following is a specification:

The nature of the invention of said ROAT consists in mixing tallow, lard, or any other good oil or grease, with sal soda, salts of tartar, carbonate of ammonia, beeswax, borax, and plumbago, to form a preparation or oil for the uses and purposes above mentioned.

To prepare the lubricating oil, take forty-eight pounds of tallow, lard, or other oil or grease, and melt it; then heat three ounces of beeswax very hot and stir into it. Then dissolve one pound of sal soda, one ounce of borax, one ounce of salts tartar, one ounce of carbonate of ammonia in one gallon of hot soft water. When the grease or oil is cooled to about 70° Fahrenheit, stir in the last solution, mixing thoroughly. Then stir in one-half pound of plumbago, or in the proportions above mentioned; and when entirely mixed and cool the preparation is ready for use for lubricating axles, journals, engines, and machinery of all kinds.

It is claimed that with the use of this lubricator machinery will work easier, with less friction and heating, and run longer than with any oil, substance, or preparation heretofore known.

I claim as my invention—

A compound composed of any tallow, lard, oil, or grease ordinarily used for lubricating purposes, and beeswax mixed with a solution of sal soda, borax, salts of tartar, and carbonate of ammonia, to which is added plumbago, substantially in the proportions and for the purposes above set forth.

EDWIN ROAT.

Witnesses:
C. M. FELLOWS,
S. B. PORTER.